United States Patent Office 2,776,958
Patented Jan. 8, 1957

2,776,958
NEW WATER-SOLUBLE MORDANT AZOPHTHALO-CYANINE DYESTUFFS AND PROCESS FOR MAKING SAME

Willy Brentano, Arlesheim, near Basel, Switzerland, assignor to Durand & Huguenin A. G., Basel, Switzerland, a Swiss company No Drawing. Application January 12, 1954, Serial No. 403,654

Claims priority, application Switzerland January 14, 1953

7 Claims. (Cl. 260—146)

In copending U. S. patent application, Serial No. 329,727, filed January 5, 1953 (since granted as U. S. Patent No. 2,706,199) there are described water-soluble esters of phthalocyanine tetrasulphonic acids, which contain at least one salicylic acid group and are blue to green dyestuffs which are suitable for dyeing and printing textiles. These dyestuffs are distinguished by their mordant character and yield especially valuable blue tints, having very good properties of fastness.

There are also described in copending U. S. patent application, Serial No. 370,612, filed July 27, 1953, water-soluble mordant azophthalocyanine dyestuffs which are obtained by reacting a phthalocyanine sulphochloride derived from a phthalocyanine tetrasulphonic acid with 1–4 molecular proportions of at least one aminoazodyestuff which contains a salicylic acid grouping. These dyestuffs yield green to olive tints which in some cases possess very good properties of fastness.

The present invention provides new, very valuable, water-soluble, mordant azophthalocyanine dyestuffs of the general formula

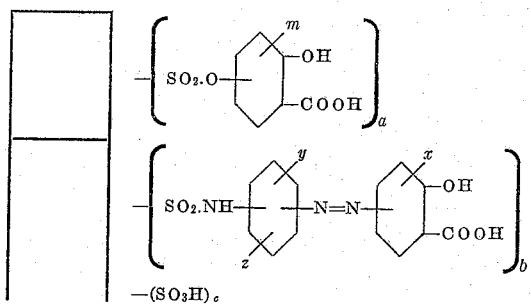

and the alkali metal salts thereof, which A represents a substituted or unsubstituted metalliferous phthalocyanine molecule to which the —$SO_2.O$—, —$SO_2.NH$— and —$SO_3H$ groups are bound in the 3- or 4-positions, $m$ represents H, halogen or $CH_3$ bound in ortho-position to the —$SO_2.O$— linkage, $x$ represents H, $CH_3$, OH, $NO_2$ or $SO_3H$, $y$ represents H, $CH_3$ $OCH_3$, $SO_3H$ or COOH bound in ortho-position to the azo group, $z$ represents H or $OCH_3$ bound in ortho-position to the —$SO_2.NH$— linkage, $a$ and $b$ each represents a whole number from 1 to 3 inclusive, $c$ is zero or the whole number 1 or 2, and the sum of $a+b+c=4$ and in which the —$SO_2.NH$— group occupies a meta- or para-position relatively to the azo linkage.

The invention also includes a process for making the above dyestuffs, wherein one molecular proportion of a phthalocyanine sulphochloride of the formula

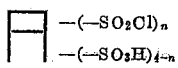

in which A represents a substituted or unsubstituted metalliferous phthalocyanine molecule to which the —$SO_2Cl$ and —$SO_3H$ groups are bound in the 3- and 4-positions, and $n$ represents a whole number from 1 to 4 is reacted with at least one molecular proportion of an amino-azo-dyestuff of the general formula

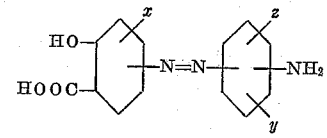

in which $x$ represents H, $CH_3$, OH, $NO_2$ or $SO_3H$, $y$ represents H, $CH_3$, $OCH_3$, $SO_3H$ or COOH bound in ortho-position to the azo-group, and $z$ represents H or $OCH_3$ bound in ortho-position to the $NH_2$ group, and with at least one molecular proportion of a dihydroxybenzene carboxylic acid of the general formula

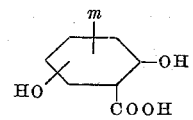

in which $m$ represents H, halogen or $CH_3$ bound in ortho-position to the reacting OH group, in an aqueous medium and in the presence of a substance capable of binding mineral acid, and the aforesaid reactions are carried out simultaneously or in either order of succession.

It has been unexpectedly found that the dyestuffs of the present invention are superior in their tinctorial properties to the dyestuffs of the aforesaid copending applications Serial Nos. 329,727 and 370,612. This superiority lies principally in the enhanced general properties of fastness of the dyestuffs of this invention. As compared with the dyestuffs of aforesaid copending application Serial No. 370,612, the dyestuffs of the present invention yield, especially in chrome printing, substantially purer green to olive tints.

Among the sulphochlorides of phthalocyanine tetrasulphonic acids suitable in the process of this invention there are included those which can be made by methods in themselves known. As phthalocyanine sulphochlorides suitable for the reaction there come into consideration more especially the sulphochlorides of copper-, nickel- or cobalt-phthalocyanine, and also those of iron-, chromium- or aluminium-phthalocyanine. Depending on the method used for preparing the sulphochloride, the sulphochloride groups are present in the phthalocyanine molecule in the 4- or 3-positions, and this depends on whether they have been prepared by starting from 4-sulpho-phthalic acid, or whether the sulphochloride groups are introduced by sulphonation or by direct sulphochlorination of the phthalocyanine. The number of sulphochloride groups in the molecule may range from 1 to 4. In the preparation of the sulphochlorides of phthalocyanine tetrasulphonic acids, and especially in their isolation, there are generally obtained mixtures of phthalocyanines containing different numbers of sulphochloride groups.

Suitable amino-azo-dyestuffs capable of taking part in the reaction are those of the general formula

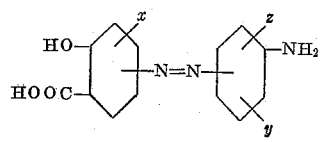

in which $x$, $y$ and $z$ have the meanings given above, and the —$NH_2$ group occupies a meta- or para-position with respect to the azo linkage. As examples there may be mentioned:

3-amino-4'-hydroxy-1:1'-azobenzene-5'-carboxylic acid
3 - amino - 2' - methyl - 4' - hydroxy - 1:1' - azobenzene - 5'-carboxylic acid
3 - amino - 3' - methyl - 4' - hydroxy - 1:1 - azobenzene - 5'-carboxylic acid
3 - amino - 4' - hydroxy - 1:1' - azobenzene - 5' - carboxylic acid-6-sulphonic acid
3 - amino - 4' - hydroxy - 1:1' - azobenzene - 5' - carboxylic acid-4-sulphonic acid
3 - amino - 4 - methyl - 4' - hydroxy - 1:1' - azobenzene - 5'-carboxylic acid
3 - amino - 6 - methyl - 4' - hydroxy - 1:1' - azobenzene - 5'-carboxylic acid
3 - amino - 6 - methoxy - 4' - hydroxy - 1:1' - azobenzene - 5'-carboxylic acid
3 - amino - 2':4' - dihydroxy - 1:1' - azobenzene - 5' - carboxylic acid
3 - amino - 6 - chloro - 4' - hydroxy - 1:1' - azobenzene - 5'-carboxylic acid
4 - amino - 4' - hydroxy - 1:1' - azobenzene - 5' - carboxylic acid
4 - amino - 2' - methyl - 4' - hydroxy - 1:1' - azobenzene - 5'-carboxylic acid
4 - amino - 3' - methyl - 4' - hydroxy - 1:1' - azobenzene - 5'-carboxylic acid
4 - amino - 4' - hydroxy - 1:1' - azobenzene - 5' - carboxylic acid-5-sulphonic acid
4 - amino - 4' - hydroxy - 1:1' - azobenzene - 5' - carboxylic acid-6-sulphonic acid
4 - amino - 2 - methyl - 4' - hydroxy - 1:1' - azobenzene-5'-carboxylic acid
4 - amino - 3 - methyl - 4' - hydroxy - 1:1' - azobenzene-5'-carboxylic acid
4 - amino - 2 - methyl - 3' - methyl - 4' - hydroxy - 1:1' - azobenzene-5'-carboxylic acid
4 - amino - 2 - methoxy - 4' - hydroxy - 1:1' - azobenzene - 5'-carboxylic acid
4 - amino - 3 - methoxy - 4' - hydroxy - 1:1' - azobenzene - 5'-carboxylic acid
4 - amino - 3 - ethoxy - 4' - hydroxy - 1:1' - azobenzene - 5'-carboxylic acid
4 - amino - 2 - methyl - 5 - methoxy - 4' - hydroxy - 1:1' - azobenzene-5'-carboxylic acid
4 - amino - 2:5 - dimethoxy - 4' - hydroxy - 1:1' - azobenzene-5'-carboxylic acid
4 - amino - 2 - chloro - 4' - hydroxy - 1:1' - azobenzene - 5'-carboxylic acid
4 - amino - 2 - nitro - 4' - hydroxy - 1:1' - azobenzene - 5'-carboxylic acid
4 - amino - 4' - hydroxy - 1:1' - azobenzene - 2:5' - dicarboxylic acid
4 - amino - 2':4' - dihydroxy - 1:1' - azobenzene - 5' - carboxylic acid
4 - amino - 2 - methyl - 3' - chloro - 4' - hydroxy - 1:1' - azobenzene-5'-carboxylic acid
4 - amino - 2 - methyl - 3' - nitro - 4' - hydroxy - 1:1' - azobenzene-5'-carboxylic acid
4 - amino - 2 - methyl - 5 - methoxy - 4' - hydroxy - 1:1' - azobenzene-5'-carboxylic acid-3'-sulphonic acid
4 - amino - 2 - methyl - 4' - hydroxy - 1:1' - azobenzene - 5'-carboxylic acid-3'-sulphonic acid
4 - amino - 3 - methyl - 4' - hydroxy - 1:1' - azobenzene - 5'-carboxylic acid-3'-sulphonic acid
4 - amino - 2 - bromo - 4' - hydroxy - 1:1' - azobenzene - 5'-carboxylic acid-6-sulphonic acid
4 - amino - 2:6 - dibrom - 4' - hydroxy - 1:1' - azobenzene-5'-carboxylic acid
4 - amino - 2 - methyl - 5 - methoxy - 2' - hydroxy - 1:1' - azobenzene-3'-carboxylic acid
4 - amino - 3 - methyl - 2' - hydroxy - 1:1' - azobenzene - 3'-carboxylic acid-5'-sulphonic acid
4 - amino - 2 - methyl - 5 - methoxy - 5' - nitro - 2' - hydroxy-1:1'-azobenzene-3'-carboxylic acid
4 - amino - 2 - methyl - 3' - hydroxy - 1:1' - azobenzene - 4'-carboxylic acid
4 - amino - 3 - methyl - 3' - hydroxy - 1:1" - azobenzene - 4'-carboxylic acid.

Suitable dihydroxy-benzene carboxylic acids capable of taking part in the reaction are, for example, 1:4-dihydroxybenzene-5-carboxylic acid (gentisic acid), 3-chloro-1:4-dihydroxybenzene-5-carboxylic acid, 3-bromo-1:4-dihydroxybenzene-5-carboxylic acid, 3-methyl-1:4-dihydroxybenzene - 5 - carboxylic acid, 1:4 dihydroxybenzene - 5-carboxylic acid-3-sulphonic acid, 1:3-dihydroxybenzene-4-carboxylic acid (β-resorcylic acid), 6-chloro-1:3-dihydroxybenzene-4-carboxylic acid, 6-bromo-1:3-dihydroxybenzene-4-carboxylic acid, 5-methyl-1:3-dihydroxybenzene-4-carboxylic acid, 1:2:3-trihydroxybenzene-4-carboxylic acid (pyrogallolcarboxylic acid), 1:2-dihydroxybenzene-3-carboxylic acid, 1:2-dihydroxybenzene-3-carboxylic acid-5-sulphonic acid and the like.

The reaction of the sulphonic acid chlorides of the phthalocyanine sulphonic acids with the amino-azo-dyestuffs and the dihydroxy-benzene carboxylic acids is carried out in an aqueous medium and in the presence of at least one substance capable of binding a mineral acid such, for example, as an alkali hydroxide, alkaline earth metal hydroxide, an alkali carbonate, an alkaline earth metal carbonate, an alkali bicarbonate, magnesium oxide, sodium acetate, ammonia, ammonium carbonate, dimethyl-formamide, triethanolamine, pyridine or the like.

The reactions of the sulphochloride with the aminoazo-dyestuff and with the dihydroxybenzene carboxylic acid may be carried out simultaneously or in either order of succession.

The reaction temperature is of minor importance and may vary within very wide limits, but it is of advantage to work at low temperatures, advantageously, at temperatures within the range of 0° C. to 30° C.

Depending on the choice of the reaction temperature and the substance capable of binding mineral acid, hydrolysis of the sulphochloride groups during the reaction, which can never be entirely avoided, can be suppressed to a greater or less extent. It is not absolutely necessary that all the sulphochloride groups should react with the aminoazo-dyestuff and the dihydroxybenzene carboxylic acid. It is often of advantage, especially with regard to its solubility, that the dyestuff should still contain one or two sulpho-groups.

The various sulphochlorides used in the process of the invention are reacted with at least one molecular proportion of the aminoazo-dyestuff and at least one molecular proportion of a dihydroxybenzene carboxylic acid. Thus, one mol of phthalocyanine tetrasulphochloride may be reacted with one mol of aminoazo-dyestuff and with one mol or two mols of a dihydroxybenzene carboxylic acid, or with two mols of aminoazo-dyestuff and one mol of a dihydroxybenzene-carboxylic acid, or with three mols of aminoazo-dyestuff and with one mol of a dihydroxybenzene carboxylic acid, or with 1 mol of aminoazo-dyestuff and with three mols of a dihydroxybenzene carboxylic acid, or with two mols of aminoazo-dyestuff and with two mols of a dihydroxybenzene carboxylic acid.

The invention also includes reacting the sulpochloride of the phthalocyanine tetrasulphonic acid with a mixture of at least two aminoazo-dyestuffs and a dihydroxybenzene carboxylic acid of the above general formulae, or with a mixture of at least two dihydroxy-benzene carboxylic acids and an aminoazo-dyestuff or with a mixture of two aminoazo-dyestuffs and two dihydroxybenzene carboxylic acids.

It is not certain in all cases whether the sulphochloride groups are wholly or only partially converted into sulphonic acid amide groups and ester groups in accordance with the invention.

Depending on the choice of the phthalocyanine sulphochloride used and on the number of mols of aminoazo-dyestuff (1–3) and of dihydroxybenzene carboxylic acid (3–1) used for the reaction, there are obtained dyestuffs having different tinctorial properties.

Owing to the presence of at least two salicylic acid groups in the dyestuff molecule, it is possible to fix the dyestuff on the fibre in the form of a chromium lake by known methods. The new dyestuffs are especially suitable for chrome printing on cotton. The mordant character of the phthalocyanine dyestuffs of the invention increases as the number of salicylic acid groups increases, which is quite evident from the progressive improvement in the properties of wet fastness. Green to olive tints are produced which are distinguished by their very good to excellent general properties of fastness.

Moreover, the new dyestuffs, when they contain sufficient mordanting groups, can be fixed on textile fibres by after-treatment by known methods with agents yielding metal, especially in conjunction with basic substances of high molecular weight. Green to olive dyeings which are distinguished by their good fastness to washing and light are produced, more especially, by after-treating prints on cellulose fibres or fibres of regenerated celluloses with an agent yielding copper together with a basic condensation product of high molecular weight.

The alkali salts of the azo-phthalocyanine dyestuffs of the invention are easily soluble in water, and are suitable for dyeing and printing vegetable, animal and wholly synthetic fibres, and also for dyeing oxidic protective coatings on aluminium. Especially valuable are the dyestuffs described in the succeeding Examples 2 (fourth paragraph), 3, 12, 26 and 28.

The following examples illustrate the invention, the parts being by weight:

*Example 1*

96.9 parts (1/10 mol) of freshly prepared copper phthalocyanine tetrasulphochloride (obtained by the action of chlorosulphonic acid on copper phthalocyanine) are poured on to ice, and the precipitated reaction product is mixed in the form of a moist paste with 350 parts of crushed ice. There is then rapidly added, while stirring, a cold solution of 27.9 parts (1/10 mol) of the sodium salt of 3-amino-4'-hydroxy-1:1'-azobenzene-5'-carboxylic acid and 59.4 parts (3/10 mol) of the disodium salt of 1:3-dihydroxybenzene-4-carboxylic acid in 600 parts of water, to which 20 parts of calcium carbonate have been added, and the whole is stirred for 5 hours at 5–10° C. and for a further 24 hours at room temperature. When the reaction is finished, the mixture is rendered weakly acid with dilute hydrochloric acid, and the precipitated dyestuff acid is filtered off with suction and washed with dilute hydrochloric acid. It is then dissolved in water and sodium carbonate, and the dyestuff is isolated in the form of its sodium salt by salting out with sodium chloride from a weakly alkaline medium.

The dyestuff so obtained is a green powder which dissolves in water with a blue-green coloration and in concentrated sulphuric acid with a yellow-green coloration.

When used for chrome printing on cotton the dyestuff yields a deep yellowish green tint having excellent properties of fastness.

By using 55.8 parts (2/10 mol) of the sodium salt of 3-amino-4'-hydroxy-1:1'-azobenzene-5'-carboxylic acid, instead of 27.9 parts (1/10 mol) thereof, and 39.6 parts (2/10 mol) of the disodium salt of 1:3-dihydroxybenzene-4-carboxylic acid, instead of 59.4 parts (3/10 mol) thereof, there is obtained a dyestuff which yields in chrome printing on cotton a grass green tint having excellent properties of wet fastness and an excellent fastness to light. The dyestuff is also suitable for dyeing oxidic protective coatings on aluminium, whereby a pure blue-green tint is produced.

By using 83.7 parts (3/10 mol) of the sodium salt of 3-amino-4'-hydroxy-1:1'-azobenzene-5'-carboxylic acid, instead of 55.8 parts (2/10 mol) thereof, and 19.8 parts (1/10 mol) of the disodium salt of 1:3-dihydroxybenzene-4-carboxylic acid, instead of 39.6 parts (2/10 mol) thereof, there is obtained a dyestuff suitable for dyeing cotton and viscose. A powerful blue green tint is produced on pre-chromed cotton. The dyestuff is especially suitable for chrome printing on cotton. There are obtained blue-green prints having good properties of wet fastness and very good fastness to light.

*Example 2*

96.9 parts (1/10 mol) of freshly prepared copper phthalocyanine-4:4':4":4"'-tetrasulphochloride, obtained by the action of chlorosulphonic acid on copper phthalocyanine-4:4':4":4"'-tetrasulphonic acid (obtained from 4-sulphophthalic acid), are discharged on to ice and the precipitated reaction product is mixed in the form of a moist paste with 350 parts of disintegrated ice. There is rapidly added, while cooling, a cold solution of 27.9 parts (1/10 mol) of the sodium salt of 3-amino-4'-hydroxy-1:1'-azobenzene-5'-carboxylic acid and 59.4 parts (3/10 mol) of the disodium salt of 1:3-dihydroxybenzene-4-carboxylic acid in 600 parts of water, to which 15 parts of calcium carbonate have been added. The whole is stirred for 3–4 hours at 5–10° C., and for a further 48 hours at room temperature. When the reaction is finished, the mixture is rendered acid (pH=3) to Congo by the addition of dilute hydrochloric acid, and the precipitated dyestuff acid is separated and converted into its sodium salt.

The dyestuff so obtained is a dark violet powder which dissolves in water with a turquoise blue coloration and in concentrated sulphuric acid with a yellow green coloration.

The dyestuff is suitable for dyeing cotton, viscose, nylon and wool. By after-chroming the dyeings there are obtained on wool bluish green tints and on cotton powerful blue-green tints, which are distinguished by their good properties of wet fastness and very good fastness to light. The dyestuff is especially suitable for chrome printing on cotton. It yields a bright deep blue-green tint having excellent properties of fastness and an outstanding fastness to light. The dyestuff is also suitable for dyeing oxidic protective coatings on aluminium.

By using 55.8 parts (2/10 mol) of the sodium salt of 3-amino-4'-hydroxy-1:1'-azobenzene-5'-carboxylic acid, instead of 27.9 parts (1/10 mol) thereof, and 39.6 parts (2/10 mol) of the disodium salt of 1:3-dihydroxybenzene-4-carboxylic acid, instead of 59.4 parts (3/10 mol) thereof, there is obtained a dyestuff of the formula

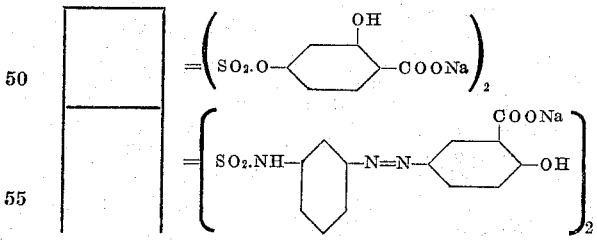

which is a derivative of copper-phthalocyanine-4,4',4",4"'-tetrasulphonic acid, and yields in chrome printing on cotton, green tints possessing outstanding properties of wet fastness and an excellent fastness to light.

By using 83.7 parts (3/10 mol) of the sodium salt of 3 - amino - 4' - hydroxy - 1:1' - azobenzene - 5' - carboxylic acid, instead of 55.8 parts (2/10 mol) thereof, and 19.8 parts (1/10 mol) of the disodium salt of 1:3-dihydroxybenzene-4-carboxylic acid, instead of 39.6 parts (2/10 mol) thereof, there is obtained a dyestuff which yields in chrome printing on cotton bright deep yellow green tints having very good properties of wet fastness and an excellent fastness to light.

*Example 3*

96.9 parts (1/10 mol) of copper phthalocyanine tetrasulphochloride, obtained as described in Example 1, are stirred in 350 parts of ice to form a homogeneous paste. There is then added, while stirring, a solution of 39.6 parts (²/₁₀ mol) of the disodium salt of 1:3-dihydroxybenzene-4-carboxylic acid in 200 parts of ice water (Solution I), and the whole is stirred for one hour. There is then rapidly added a solution of 27.9 parts (¹/₁₀ mol) of the sodium salt of 3-amino-4'-hydroxy-1:1'-azobenzene-5'-carboxylic acid in 250 parts of water (solution II), to which 10 parts of calcium carbonate have been added, and the whole is stirred for 24 hours at 15–20° C. When the reaction is finished, the mixture is rendered acid (Ph=3) to Congo with dilute hydrochloric acid, and the precipitated dyestuff acid is separated off and dissolved in water and sodium carbonate, and the dyestuff is salted out with sodium chloride.

The dyestuff so obtained corresponds to the formula

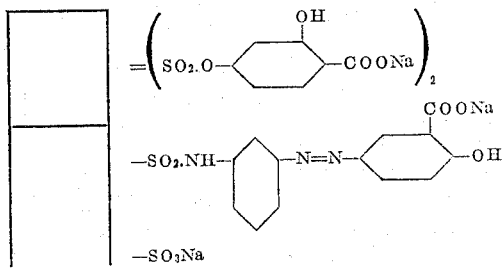

is a derivative of copper-phthalocyanine-3,3',3'',3'''-tetrasulphonic acid, and is a blue-green powder which dissolves in water with a blue coloration and in concentrated sulphuric acid with a yellow-green coloration.

In chrome printing on cotton the dyestuff yields deep grass green tints having very good properties of wet fastness and an excellent fastness to light.

By first using solution II, instead of solution I, stirring the mixture for one hour, and then adding solution I, there is obtained a dyestuff which is identical with the dyestuff described above. By adding solution I and II simultaneously (a mixture) the same dyestuff is also obtained.

*Example 4*

48.5 parts (¹/₂₀ mol) of copper phthalocyanine tetrasulphochloride is obtained as described in Example 1, are mixed with 200 parts of ice, and there is rapidly added while stirring a solution of 9.8 parts (¹/₂₀ mol) of the disodium salt of 1:3-dihydroxybenzene-4-carboxylic acid and 14 parts (¹/₂₀ mol) of the sodium salt of 3-amino-4'-hydroxy-1:1'-azobenzene-5'-carboxylic acid in 350 parts of ice water, to which 10 parts of calcium carbonate have been added, and the whole is stirred for 2 hours at room temperature and for a further two hours at 70° C. When the reaction is finished, the mixture is rendered weakly acid (pH=3) to Congo with dilute hydrochloric acid, and the precipitated dyestuff acid is separated off, dissolved in water and sodium carbonate, and the dyestuff is salted out with sodium chloride.

The dyestuff so obtained is a dark blue-green powder, which dissolves in water with a greenish blue coloration and in concentrated sulphuric acid with a yellow-green coloration.

By acid dyeing on wool there is produced a blue-green tint, which is converted into a deep green by after-chroming. The dyestuff yields on viscose and cotton blue-green tints and on prechromed cotton powerful green tints. It dyes anodically oxidised aluminium blue-green tints.

In chrome printing on cotton it yields clear grass green tints having good properties of fastness.

*Example 5*

65.3 parts (¹/₁₀ mol) of dry copper-phthalocyanine disulphochloride disulphonic acid (71.2%) are added in the course of 5 minutes to a solution, cooled to 5° C., of 12.9 parts (¹/₂₀ mol) of 3-amino-4'-hydroxy-1:1'-azobenzene-5'-carboxylic acid, 7.8 parts (¹/₂₀ mol) of 1:3-dihydroxybenzene-4-carboxylic acid and 12.5 parts of sodium hydroxide (100%) in 500 parts of water, and the whole is stirred for 14 hours. When the reaction is finished, the dyestuff is salted out with 180 parts of sodium chloride and isolated in the form of its sodium salt.

The dyestuff so obtained is a blue-green powder which dissolves in water with a blue coloration and in concentrated sulphuric acid with a yellow-green coloration.

In chrome printing on cotton it yields bluish-green tints having good properties of wet fastness and very good fastness to light.

*Example 6*

44.8 parts (¹/₂₀ mol) of copper phthalocyanine tetrasulphonic acid, obtained by the sulphonation of copper phthalocyanine with oleum of 14 percent strength, are converted into the copper phthalocyanine tetrasulphochloride by means of chlorosulphonic acid and thionyl chloride, the reaction mixture is discharged on to ice and water, the press cake, after being washed with an aqueous solution of sodium chloride, is stirred in 200 parts of disintegrated ice to form a homogeneous paste, and the latter is added to a cold solution of 25.7 parts of 3 - amino - 4' - hydroxy - 1:1' - azobenzene - 5' - carboxylic acid (¹/₁₀ mol), 7.8 parts of 1:3-dihydroxybenzene-4-carboxylic acid (¹/₂₀ mol) and 19 parts of sodium hydroxide (100%) in 450 parts of water. The whole is stirred for 24 hours and, after the reaction, the dyestuff is salted out with 180 parts of sodium chloride. The dyestuff is purified by being salted out twice. The dyestuff so obtained is a green powder which dissolves in water with a blue-green coloration and in concentrated sulphuric acid with a yellow-green coloration.

In chrome printing on cotton it yields strong green tints having very good properties of fastness.

*Example 7*

48.5 parts (¹/₂₀ mol) of copper phthalocyanine tetrasulphochloride, obtained as described in Example 1, are discharged on to ice and the separated reaction product is well mixed in the form of a moist paste with 250 parts of ice, and there is rapidly added a cold solution of 19.8 parts (¹/₁₀ mol) of the disodium salt of 1:3-dihydroxybenzene-4-carboxylic acid and 14.7 parts (¹/₂₀ mol) of the sodium salt of 4-amino-3'-methyl-4'-hydroxy-1:1'-azobenzene-5'-carboxylic acid in 450 parts of water, to which 5 parts of calcium carbonate have been added, and the whole is stirred for 24 hours at room temperature. After acidifying the mixture with dilute hydrochloric acid, the precipitated dyestuff acid is separated off and converted into its sodium salt.

The dyestuff so obtained is a blue-green powder which dissolves in water with a greenish-blue coloration and in concentrated sulphuric acid with an olive coloration.

In chrome printing on cotton it yields clear blue-green tints having good properties of wet fastness and a good fastness to light.

*Example 8*

29 parts (³/₁₀₀ mol) of copper phthalocyanine tetrasulphochloride, obtained as described in Example 1, are mixed with 150 parts of crushed ice, and there are rapidly added while stirring, in an atmosphere of nitrogen a solution of 11.8 parts (⁶/₁₀₀ mol) of the disodium salt of 1:4-dihydroxybenzene-5-carboxylic acid and 8.9 parts (³/₁₀₀ mol) of the sodium salt of 4-amino-2':4'-dihydroxy-1:1'-azobenzene-5'-carboxylic acid in 300 parts of water, to which 5 parts of calcium carbonate have been added. The whole is stirred for 10 hours at 5–10° C., and for a further 15 hours at room temperature. The dyestuff is isolated in the manner described in Example 1.

The dyestuff so obtained is a dark grey powder which dissolves in water with a green coloration and in concentrated sulphuric acid with an olive coloration.

In chrome printing on cotton it yields dark olive green tints having good properties of fastness.

Example 9

96.9 parts (1/10 mol) of freshly prepared copper phthalocyanine tetrasulphochloride, obtained by the action of chlorosulphonic acid on copper phthalocyanine, are discharged on to ice and the separated reaction product is mixed in the form of a moist paste with 350 parts of crushed ice. There is rapidly added, while stirring, a cold solution of 39.6 parts (2/10 mol) of the disodium salt of 1:3-dihydroxybenzene-4-carboxylic acid and 76.2 parts (2/10 mol) of the disodium salt of 4-amino-4'-hydroxy-1:1'-azobenzene-5'-carboxylic acid-6-sulphonic acid in 600 parts of water, to which has been added 20 parts of calcium carbonate. The whole is stirred for 30 hours at 20-25° C., and after the reaction, the mixture is rendered weakly acid with hydrochloride acid, the precipitated dyestuff acid is separated off, dissolved in water and sodium carbonate, and the dyestuff is isolated by salting out with sodium chloride.

The dyestuff so obtained is a blue-black powder which dissolves in water with a blue-green coloration and in concentrated sulphuric acid with a brown coloration.

By acid dyeing on wool it yields pure yellowish green tints, and olive tints upon after-chroming. By dyeing on prechromed cotton there are produced deep strong grass green tints, and on nylon yellow-green tints and on viscose greenish-blue tints.

In chrome printing on cotton there are obtained yellow-green tints having good properties of wet fastness and a very good fastness to light.

Example 10

48.5 parts (1/20 mol) of copper phthalocyanine tetrasulphochloride, obtained as described in Example 1, are stirred to form a homogeneous paste with 250 parts of ice water, and the mixture is added to a solution of 9.9 parts (1/20 mol) of the disodium salt of 1:3-dihydroxybenzene-4-carboxylic acid, 42.5 parts (1/10 mol) of the disodium salt of 4-amino-2-methyl-5-methoxy-4'-hydroxy-1:1'-azobenzene-5'-carboxylic acid-3'-sulphonic acid and 5 parts of sodium carbonate in 500 parts of water, and the whole is stirred for 24 hours at 15-20° C. The sodium salt of the dyestuff is isolated in the usual manner.

The dyestuff so obtained is an olive powder which dissolves in water with a green coloration and in concentrated sulphuric acid with a pink coloration.

In chrome printing on cotton the dyestuff yields yellow-green tints.

Example 11

48.5 parts (1/20 mol) of copper phthalocyanine tetrasulphochloride, obtained as described in Example 1, are mixed with 250 parts of ice, and rapidly added to a solution of 30.9 parts (1/10 mol) of the dipotassium salt of 6-bromo-1:3-dihydroxybenzene-4-carboxylic acid and 14.6 parts (1/20 mol) of the sodium salt of 4-amino-2-methyl-4'-hydroxy-1:1'-azobenzene-5'-carboxylic acid in 500 parts of water, to which 8 parts of calcium carbonate have been added, and the whole is stirred for 24 hours at 20° C. The dyestuff is isolated in the manner described in Example 1.

The dyestuff so obtained is a grey-olive powder which dissolves in water with a green coloration and in concentrated sulphuric acid with a dirty orange coloration.

In chrome printing on cotton the dyestuff yields yellow-green tints having good properties of fastness.

Example 12

96.9 parts (1/10 mol) of freshly prepared copper phthalocyanine tetrasulphochloride (crude product), obtained by the action of chlorosulphonic acid on copper phthalocyanine, are discharged on to ice, and the precipitated reaction product is mixed in the form of a moist paste with 300 parts of broken ice. There is then rapidly added, while stirring, a solution of 30.9 parts (1/10 mol) of the dipotassium salt of 6-bromo-1:3-dihydroxybenzene-4-carboxylic acid, 59 parts (2/10 mol) of the potassium salt of 3-amino-4'-hydroxy-1:1'-azobenzene-5'-carboxylic acid and 15 parts of potassium hydroxide (100%) in 600 parts of water, and the whole is stirred for 10 hours at 5-10° C. and for a further 5 hours at room temperature. When the reaction is finished, the whole is rendered weakly acid with dilute hydrochloric acid, the precipitated dyestuff acid is separated off, the latter is dissolved in water and potassium carbonate and the dyestuff is salted out from the weakly alkaline medium with potassium chloride.

The dyestuff so obtained corresponds to the formula

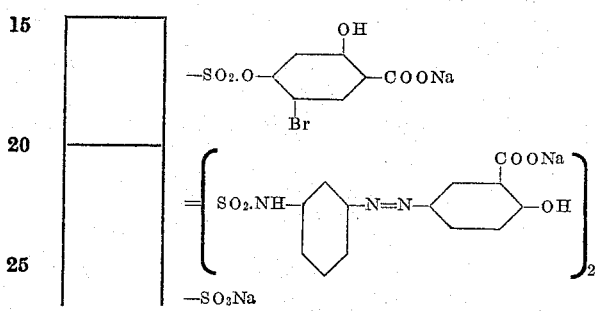

is a derivative of copper-phthalocyanine-3,3',3'',3'''-tetrasulphonic acid and is a green powder which dissolves in water with a blue-green coloration and in concentrated sulphuric acid with a yellow-green coloration.

In dyeing wool from an acid bath with the dyestuff there are obtained blue-green tints, and when the dyeings are after-chromed strong yellowish green tints are produced. By direct dyeing on viscose there are obtained strong bluish green tints.

In chrome printing on cotton there are obtained clear grass green tints having excellent properties of fastness.

Example 13

48.5 parts (1/20 mol) of copper phthalocyanine tetrasulphochloride, obtained as described in Example 1, are discharged on to ice, the reaction product is separated and mixed with 200 parts of ice, and the whole is rapidly added, while stirring, to a solution of 23.0 parts (1/10 mol) of the dipotassium salt of 1:3-dihydroxybenzene-4-carboxylic acid and 41.3 parts (1/10 mol) of the dipotassium salt of 3-amino-4'-hydroxy-1:1'-azobenzene-5'-carboxylic acid-6-sulphonic acid in 400 parts of water, to which 10 parts of calcium carbonate have been added, and the whole is stirred for 24 hours at 10-20° C. The dyestuff is isolated as described in Example 11.

The dyestuff so obtained is a blue-green powder which dissolves in water with a blue coloration and in concentrated sulphuric acid with a yellow-green coloration.

In chrome printing on cotton the dyestuff yields grass green tints having good properties of fastness.

Example 14

48.5 parts (1/20 mol) of copper phthalocyanine-4:4':4'':4'''-tetrasulphochloride (obtained as described in Example 2), are discharged on to ice, and the separated reaction product in the form of a moist paste is mixed well with 250 parts of broken ice, and the whole is rapidly added to an ice-cold solution of 19.8 parts (1/10 mol) of the disodium salt of 1:3-dihydroxybenzene-4-carboxylic acid and 42.5 parts (1/10 mol) of the disodium salt of 4-amino-2-methyl-5-methoxy-4'-hydroxy-1:1'-azobenzene-5'-carboxylic acid-3'-sulphonic acid in 350 parts of water, to which has been added 10 parts of calcium carbonate. The whole is stirred for 48 hours at 15-20° C. The dyestuff is isolated as described in Example 8.

The dyestuff so obtained is a blue-black powder which dissolves in water with a green coloration and in concentrated sulphuric acid with a dirty red-brown coloration.

In acid dyeing on wool the dyestuff yields beautiful yellow-olive tints, and in dyeing on prechromed cotton strong olive green tints are obtained. In chrome printing on cotton there are obtained yellow-olive tints having good properties of wet fastness and moderate fastness to light.

*Example 15*

48.5 parts ($\frac{1}{20}$ mol) of copper phthalocyanine-4:4':4":4'''-tetrasulphochloride are treated in a manner analogous to that described in Example 2, and the paste so obtained is mixed with a cold solution of 9.9 parts ($\frac{1}{20}$ mol) of the disodium salt of 1:3-dihydroxybenzene-4-carboxylic acid and 44 parts ($\frac{3}{20}$ mol) of the sodium salt of 4-amino-2-methyl-4'-hydroxy-1:1'-azobenzene-5'-carboxylic acid in 400 parts of water, to which have been added 10 parts of calcium carbonate, the whole is stirred for 48 hours at room temperature. When the reaction is finished, the mixture is rendered weakly acid (pH=3) to Congo with dilute hydrochloric acid, and the precipitated dyestuff acid is converted in the usual manner into its sodium salt.

The dyestuff so obtained is a dark green powder which dissolves in water with a green coloration and in concentrated sulphuric acid with a dirty orange coloration.

In chrome printing on cotton the dyestuff yields yellow-green tints having excellent properties of wet fastness and a good fastness to light.

*Example 16*

29 parts ($\frac{3}{100}$ mol) of a copper phthalocyanine-4:4':4":4'''-tetrasulphochloride, obtained as described in Example 2, are mixed with 150 parts of ice, and the whole is rapidly added while stirring to an ice-cold solution of 11.9 parts ($\frac{3}{100}$ mol) of the disodium salt of 1:3-dihydroxybenzene-4-carboxylic acid, 17.7 parts ($\frac{9}{100}$ mol) of the sodium salt of 4-amino-2':4'-dihydroxy-1:1'-azobenzene-5'-carboxylic acid and 8 parts of sodium acetate in 400 parts of water at 0–5° C. The whole is stirred at that temperature for 5 hours and then for a further 40 hours at room temperature. The dyestuff is isolated as described in Example 14.

The dyestuff so obtained is a blue-violet powder which dissolves in water with an olive coloration and in concentrated sulphuric acid with an olive green coloration.

In chrome printing on cotton the dyestuff yields olive tints having very good properties of wet fastness and a moderate fastness to light.

*Example 17*

48.5 parts ($\frac{1}{20}$ mol) of freshly prepared copper phthalocyanine-4:4':4":4'''-tetrasulphochloride (obtained as described in Example 2), are discharged on to ice and the separated reaction product is mixed in the form of a moist paste with 200 parts of ice, and the whole is rapidly added while stirring, to a cold solution of 9.9 parts ($\frac{1}{20}$ mol) of 1:4-dihydroxybenzene-5-carboxylic acid (disodium salt) and 38.1 parts ($\frac{1}{10}$ mol) of the disodium salt of 3-amino-4'-hydroxy-1:1'-azobenzene-5'-carboxylic acid-6-sulphonic acid (obtained by the reaction of 3-nitraniline-6-sulphonic acid with salicylic acid, and then reducing the nitro group with sodium sulphide) in 300 parts of water, to which 10 parts of calcium carbonate have been added. The whole is stirred at room temperature for 48 hours. The dyestuff is separated by acidification with dilute sulphuric acid and converted into its sodium salt.

The dyestuff so obtained is a dark violet powder which dissolves in water with a bluish green coloration and in concentrated sulphuric acid with a yellow-brown coloration.

The dyestuff is suitable for chrome printing on cotton and yields green tints having good properties of fastness. Instead of the sodium salt, there may be used the potassium or lithium salt.

*Example 18*

48.5 parts ($\frac{1}{20}$ mol) of freshly prepared copper phthalocyanine-4:4':4":4'''-tetrasulphochloride obtained as described in Example 1, are mixed as described in Example 2 with 200 parts of ice, and rapidly added in an atmosphere of nitrogen to a solution of 11.8 parts ($\frac{1}{20}$ mol) of 1:2:3-trihydroxybenzene-4-carboxylic acid (trisodium salt) and 27.9 parts ($\frac{1}{10}$ mol) of the sodium salt of 3-amino-4'-hydroxy-1:1'-azobenzene-5'-carboxylic acid in 400 parts of water, to which 15 parts of magnesium oxide have been added. The whole is then stirred for 10 hours at 0–5° C. and for a further 30 hours at room temperature. When the reaction is finished, the product is worked up in the usual manner and the sodium salt of the dyestuff is isolated.

The dyestuff so obtained is a dark violet powder which dissolves in water with a blue-green coloration and in concentrated sulphuric acid with a yellow-green coloration.

In chrome printing on cotton the dyestuff yields blue-green tints having excellent properties of wet fastness and a good fastness to light.

*Example 19*

48.5 parts ($\frac{1}{20}$ mol) of copper phthalocyanine-4:4':4":4'''-tetrasulphochloride, obtained as described in Example 2, are discharged on to ice, the separated reaction product is mixed with 250 parts of ice, and the whole is rapidly added while stirring at 10° C. to a solution of 46.4 parts ($\frac{3}{20}$ mol) of the dipotassium salt of 6-bromo-1:3-dihydroxybenzene-4-carboxylic acid and 14.7 parts ($\frac{1}{20}$ mol) of the sodium salt of 4-amino-3'-methyl-4'-hydroxy-1:1'-azobenzene-5'-carboxylic acid in 350 parts of water, to which has been added 10 parts of magnesium carbonate. The whole is stirred for 50 hours at room temperature. After acidification with dilute hydrochloric acid, the precipitated dyestuff acid is separated off and converted into its sodium salt in the usual manner.

The dyestuff so obtained is a blue-violet powder which dissolves in water with a bright blue-green coloration and in concentrated sulphuric acid with a yellow-brown coloration.

In chrome printing on cotton, the dyestuff yields deep blue-green tints having remarkable properties of wet fastness and an excellent fastness to light.

*Example 20*

48.5 parts ($\frac{1}{20}$ mol) of freshly prepared copper phthalocyanine-4:4':4":4'''-tetrasulphochloride, obtained as described in Example 2, are discharged on to ice, and the reaction product is mixed in the form of a moist paste with 250 parts of ice, and rapidly added in an atmosphere of nitrogen, while stirring, to an ice-cold solution of 19.8 parts ($\frac{1}{10}$ mol) of the disodium salt of 1:4-dihydroxybenzene-5-carboxylic acid and 14 parts ($\frac{1}{20}$ mol) of the sodium salt of 4-amino-4'-hydroxy-1:1'-azobenzene-5'-carboxylic acid in 350 parts of ice water, to which have been added 10 parts of sodium bicarbonate. The whole is stirred for 10 hours at 5–10° C. and then for 30 hours at room temperature. The dyestuff is separated by acidification with dilute hydrochloric acid and converted into its sodium salt.

The dyestuff so obtained is a blue-violet powder which dissolves in water with a blue green coloration and in concentrated sulphuric acid with a green coloration.

The dyestuff dyes oxidic protective coatings of aluminium olive green tints. In chrome printing on cotton the dyestuff yields green tints having excellent properties of fastness.

Example 21

48.5 parts (1/20 mol) of copper phthalocyanine-4:4′:4″:4‴-tetrasulphochloride, obtained as described in Example 2, are mixed with 200 parts of broken ice, and there is added, while stirring, a cold solution of 10.6 parts (1/20 mol) of the disodium salt of 3-methyl-1:4-dihydroxybenzene-5-carboxylic acid, 57.2 parts (3/20 mol) of the disodium salt of 4-amino-4′-hydroxy-1:1′-azobenzene-5′-carboxylic acid-6-sulphonic acid and 6 parts of triethanolamine in 300 parts of water, and the whole is stirred for 48 hours at 15–20° C. When the reaction is finished the dyestuff is separated in the form of its sodium salt as described in Example 18.

The dyestuff so obtained corresponds to the formula

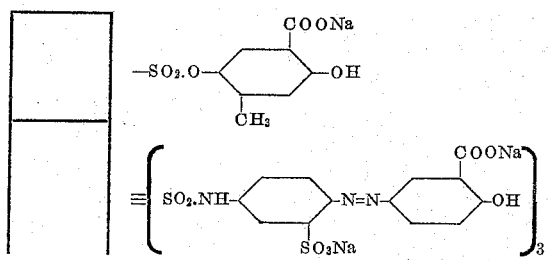

is a derivative of copper-phthalocyanine-4,4′,4″,4‴-tetrasulphonic acid, and is a blue violet powder which dissolves in water with a green coloration and in concentrated sulphuric acid with a grey brown coloration.

In chrome printing on cotton the dyestuff yields olive green tints.

Example 22

48.5 parts (1/20 mol) of freshly prepared copper phthalocyanine-4:4′:4″:4‴-tetrasulphochloride, obtained as described in Example 2, are discharged on to ice, and the reaction product is mixed in the form of a moist paste with 250 parts of ice. The whole is rapidly added, while stirring, to a cold solution of 19.8 parts (1/10 mol) of the disodium salt of 1:3-dihydroxybenzene-4-carboxylic acid and 36.8 parts (1/10 mol) of the sodium salt of 4-amino-2-methyl-5-methoxy-5′-nitro-2′-hydroxy-1:1′-azobenzene-3′-carboxylic acid in 1000 parts of water, to which have been added 10 parts of calcium carbonate. The whole is stirred for 55 hours at 15–20° C. By acidifying the reaction mixture the dyestuff acid is precipitated, and the latter is converted into its sodium salt in the usual manner.

The dyestuff so obtained is a dark violet powder which dissolves in water with a green coloration and in concentrated sulphuric acid with a brown-red coloration.

In chrome printing on cotton deep olive green tints are produced.

Example 23

48.5 parts (1/20 mol) of freshly prepared copper phthalocyanine-4:4′:4″:4‴-tetrasulphochloride, obtained as described in Example 2, are discharged on to ice and the separated reaction product is mixed as a moist paste with 200 parts of ice. The whole is rapidly added, while stirring, to an ice-cold solution of 9.9 parts (1/20 mol) of the disodium salt of 1:3-dihydroxybenzene-4-carboxylic acid and 9.9 parts (1/20 mol) of the sodium salt of 1:4-dihydroxybenzene-5-carboxylic acid and 27.9 parts (3/10 mol) of the sodium salt of 3-amino-4′-hydroxy-1:1′-azobenzene-5′-carboxylic acid in 450 parts of water, to which have been added 10 parts of calcium carbonate. The whole is stirred for 10 hours at 5–10° C. and for 35 hours at room temperature. When the reaction is finished, the mixture is rendered weakly acid with dilute hydrochloric acid, the precipitated dyestuff acid is separated off and the latter is converted into its sodium salt.

The dyestuff so obtained corresponds to the formula

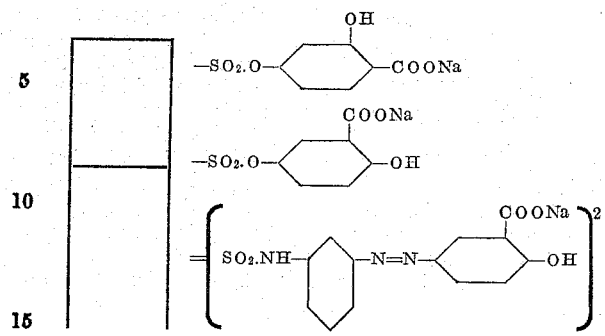

is a derivative of copper-phthalocyanine-4,4′,4″,4‴-tetrasulphonic acid, and is a dark violet powder which dissolves in water with a blue-green coloration and in concentrated sulphuric acid with an olive coloration.

In chrome printing on cotton the dyestuff yields grass green tints having excellent properties of wet fastness and a remarkable fastness to light.

Example 24

48.5 parts (1/20 mol) of copper phthalocyanine-4:4′:4″:4‴-tetrasulphochloride (obtained as described in Example 2) are discharged on to ice, and the separated reaction product is mixed with 200 parts of ice. The whole is rapidly added, while stirring, to a cold solution of 19.8 parts (1/10 mol) of the disodium salt of 1:3-dihydroxybenzene-4-carboxylic acid and 14 parts (1/20 mol) of the sodium salt of 3-amino-4′-hydroxy-1:1′-azobenzene-5′-carboxylic acid and 19 parts (1/20 mol) of the disodium salt of 3-amino-4′-hydroxy-1:1′-azobenzene-5′-carboxylic acid-6-sulphonic acid in 400 parts of water, to which have been added 10 parts of calcium carbonate. The whole is stirred for 48 hours at room temperature. The dyestuff is isolated as described in Example 16.

The dyestuff so obtained is a grey blue powder which dissolves in water with a greenish blue coloration and in concentrated sulphuric acid with a greenish yellow coloration.

In chrome printing on cotton the dyestuff yields grass green tints having very good properties of wet fastness and a remarkable fastness to light.

Example 25

48.5 parts (1/20 mol) of copper phthalocyanine-4:4′:4″:4‴-tetrasulphochloride, obtained as described in Example 1, are discharged on to ice, the separated reaction product is mixed with 200 parts of ice, and the whole is rapidly added while stirring, to an ice-cold solution of 9.9 parts (1/20 mol) of the disodium salt of 1:3-dihydroxybenzene-4-carboxylic acid, 9.9 parts (1/20 mol) of the disodium salt of 1:4-dihydroxybenzene-5-carboxylic acid, and 14 parts (1/20 mol) of the sodium salt of 3-amino-4′-hydroxy-1:1′-azobenzene-5′-carboxylic acid and 15.5 parts (1/20 mol) of the sodium salt of 3-amino-6-methoxy-4′-hydroxy-1:1′-azobenzene-5′-carboxylic acid in 500 parts of water, to which have been added 10 parts of calcium carbonate. The whole is stirred for 48 hours at room temperature. After acidifying the reaction mixture with dilute hydrochloric acid the dyestuff acid is separated off and converted into its sodium salt in the usual manner.

The dyestuff so obtained is a dark violet powder which dissolves in water with a blue green coloration and in concentrated sulphuric acid with a brown coloration.

In chrome printing on cotton the dyestuff yields yellowish green tints having very good properties of wet fastness and of excellent fastness to light.

Example 26

56.4 parts (1/20 mol) of brominated copper phthalocyanine-4:4′:4″:4‴-tetrasulphochloride, obtained by the action of chlorosulphonic acid on the tetrasodium salt of brominated copper phthalocyanine-4:4':4'':4'''-sulphonic acid (containing 11.5 percent of bromine by analysis), are discharged on to ice, and the separated reaction product is mixed with 300 parts of broken ice. The whole is rapidly added, while stirring, to a solution of 19.8 parts (1/10 mol) of the disodium salt of 1:3-dihydroxybenzene-4-carboxylic acid and 14 parts (1/20 mol) of the sodium salt of 3-amino-4'-hydroxy-1:1'azobenzene-5'-carboxylic acid in 300 parts of water, to which have been added 10 parts of calcium carbonate. The whole is stirred at room temperature for 48 hours and the dyestuff is isolated in the form of its sodium salt.

The dyestuff so obtained corresponds to the formula

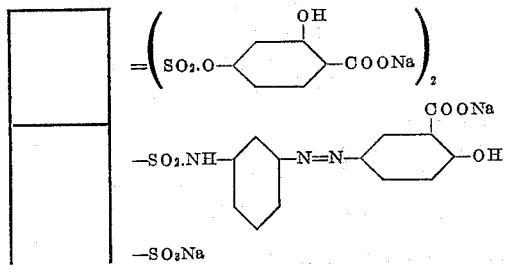

is a derivative of a brominated copper-phthalocyanine-4,4',4'',4'''-tetrasulphonic acid, and is a blue-black powder which dissolves in water with a bright blue coloration and in concentrated sulphuric acid with a yellow-green coloration.

The dyestuff is especially suitable for chrome printing on cotton. In this manner there are obtained bright grass green tints having remarkable properties of wet fastness and an excellent fastness to light.

Example 27

96.5 parts (1/10 mol) of freshly prepared cobalt phthalocyanine tetrasulphochloride, obtained by the action of chlorosulphonic acid on cobalt phthalocyanine, are discharged on to ice and the separated reaction product is mixed in the form of a moist paste with 350 parts of broken ice. The whole is rapidly added to a solution of 19.8 parts (1/10 mol) of the disodium salt of 1:3-dihydroxybenzene-4-carboxylic acid and 61.8 parts (2/10 mol) of the sodium salt of 3-amino-6-methoxy-4'-hydroxy-1:1'-azobenzene-5'-carboxylic acid in 600 parts of water, to which have been added 15 parts of calcium carbonate. The mixture is stirred for 26 hours at 15–20° C. The sodium salt of the dyestuff is isolated as described in Example 24.

The dyestuff so obtained is a blue-green powder which dissolves in water with a blue green coloration and in concentrated sulphuric acid with a dark grey coloration.

In chrome printing on cotton the dyestuff yields green tints having very good properties of fastness.

Example 28

96.5 parts (1/10 mol) of freshly prepared cobalt phthalocyanine-4:4':4'':4'''-tetrasulphochloride, obtained by the reaction of chlorosulphonic acid with cobalt phthalocyanine-4:4':4'':4'''-tetrasulphonic acid, are discharged on to ice and the separated reaction product is mixed in the form of a moist paste with 350 parts of broken ice. There is rapidly added a solution of 59.4 parts (3/10 mol) of the disodium salt of 1:3-dihydroxybenzene-4-carboxylic acid and 30.9 parts (1/10 mol) of the sodium salt of 3-amino-6-methoxy-4'-hydroxy-1:1'-azobenzene-5:-carboxylic acid in 500 parts of water, to which have been added 10 parts of calcium carbonate. The whole is stirred at room temperature for 48 hours and the dyestuff is separated in the form of its sodium salt in the usual manner.

The dyestuff so obtained corresponds to the formula

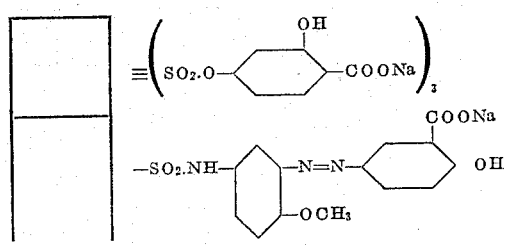

is a derivative of copper-phthalocyanine-4,4',4'',4'''-tetrasulphonic acid and is a blue black powder which dissolves in water with a blue green coloration and in concentrated sulphuric acid with an olive coloration.

The dyestuff is suitable for dyeing pre-chromed cotton, and in this manner strong grey-green tints are obtained. In dyeing on oxidic protective coatings on aluminium pure green tints are obtained. In chrome printing on cotton the dyestuff yields somewhat dull green tints having excellent properties of wet fastness.

Example 29

48.2 parts (1/20 mol) of nickel phthalocyanine tetrasulphochloride, obtained by the action of chlorosulphonic acid on nickel phthalocyanine, are discharged on to ice and the separated reaction product is mixed as a moist paste with 200 parts of ice. The whole is rapidly added to a solution of 19.8 parts (1/10 mol) of the disodium salt of 1:3-dihydroxybenzene-4-carboxylic acid and 27.9 parts (1/10 mol) of the sodium salt of 3-amino-4'-hydroxy-1:1'-azobenzene-5'-carboxylic acid in 450 parts of water, to which have been added 10 parts of calcium carbonate. The whole is stirred for 24 hours at 20° C. When the reaction is finished, the mixture is rendered weakly acid to Congo with dilute hydrochloric acid, and the dyestuff acid is separated off and isolated as its sodium salt.

The dyestuff obtained is a green powder which dissolves in water with a blue-green coloration and in concentrated sulphuric acid with a yellow-green coloration.

In acid dyeing on wool the dyestuff yields blue-green tints which become full green blue tints when after-chromed. In dyeing on pre-chromed cotton the dyestuff yields strong blue green tints, which is also the case in direct dyeing on viscose. The dyestuff is especially suitable for chrome printing on cotton, whereby deep bright grass green tints having excellent properties of wet fastness and a remarkable fastness to light are obtained.

Example 30

96.4 parts (1/10 mol) of nickel phthalocyanine-4:4':4'':4'''-tetrasulphochloride, obtained by the action of chlorosulphonic acid on nickel phthalocyanine-4:4':4'':4'''-tetrasulphonic acid, are mixed well with 350 parts of ice. The whole is rapidly added, while stirring, to a solution of 61.8 parts (2/10 mol) of 6-bromo-1:3-dihydroxybenzene-4-carboxylic acid (dipotassium salt) and 75.4 parts (2/10 mol) of the dipotassium salt of 4-amino-4'-hydroxy-1:1'-azobenzene-2:5'-dicarboxylic acid in 650 parts of water, to which have been added 15 parts of calcium carbonate. The whole is stirred for 50 hours at 15–20° C. When the reaction is finished the reaction mixture is rendered weakly acid with dilute hydrochloric acid, the precipitated dyestuff acid is separated off, and the latter is dissolved in water and sodium carbonate, and the dyestuff is salted out.

The dyestuff so obtained is a dark violet powder which dissolves in water with a blue coloration and in concentrated sulphuric acid with an olive coloration.

In chrome printing on cotton the dyestuff yields deep blue green tints having very good properties of fastness.

Example 31

47.9 parts (1/20 mol) of chromium phthalocyanine tetrasulphochloride, obtained by the action of chlorosulphonic acid on chromium phthalocyanine, are discharged on to ice and the separated reaction product is stirred as a moist paste with 200 parts of cold water to form a homogeneous paste. The latter is rapidly added to a solution, heated at 40-50° C., of 19.8 parts (1/10 mol) of the disodium salt of 1:3-dihydroxybenzene-4-carboxylic acid and 14 parts (1/20 mol) of the sodium salt of 4-amino-4'-hydroxy-1:1'-azobenzene-5'-carboxylic acid in 450 parts of water, to which have been added 10 parts of calcium carbonate, and the whole is stirred for 6 hours at 45° C. When the reaction is finished, the reaction mixture is acidified and the dyestuff acid is precipitated with dilute hydrochloric acid, separated off, and converted into its sodium salt.

The dyestuff so obtained is a green powder which dissolves in water with a blue-green coloration and in concentrated sulphuric acid with a brown coloration.

In chrome printing on cotton, yellow green tints having good properties of fastness are obtained.

Example 32

47.9 parts of chromium phthalocyanine-4:4':4'':4'''-tetrasulphochloride, obtained by the action of chlorosulphonic acid on chromium phthalocyanine-4:4':4'':4'''-tetrasulphonic acid, are discharged on to ice, and the separated reaction product is mixed as a moist paste with 250 parts of ice. The whole is rapidly added to a solution of 30.9 parts (1/10 mol) of the dipotassium salt of 6-bromo-1:3-dihydroxybenzene-4-carboxylic acid and 41.3 parts of (1/10 mol) of the dipotassium salt of 3-amino-4'-hydroxy-1:1'-azobenzene-5'-carboxylic acid-6-sulphonic acid in 400 parts of water, to which have been added 10 parts of calcium carbonate. After stirring the mixture for 10 hours at 10° C., the temperature is slowly raised to 25-30° C., and stirring is continued for a further 30 hours at that temperature. The dyestuff is separated in the form of its potassium salt in the manner described in Example 12.

The dyestuff so obtained is a blue-green powder which dissolves in water with a green coloration and in concentrated sulphuric acid with an olive coloration.

In chrome printing on cotton the dyestuff yields grass green tints having very good properties of fastness.

Example 33

96.2 parts (1/10 mol) of iron phthalocyanine tetrasulphochloride, obtained by the action of chlorosulphonic acid on iron phthalocyanine, are stirred in 300 parts of ice to form a homogeneous paste, and the latter is rapidly added in an atmosphere of nitrogen while stirring, to a solution containing 23.6 parts (1/10 mol) of the trisodium salt of 1:2:3-trihydroxybenzene-4-carboxylic acid and 75.4 parts (2/10 mol) of the dipotassium salt of 4-amino-4'hydroxy-1:1'-azobenzene-2:5'-dicarboxylic acid in 600 parts of water to which have been added 15 parts of calcium carbonate. The whole is stirred for 10 hours at 5-10° C. and for a further 20 hours at room temperature. The reaction mixture is rendered acid to Congo with dilute hydrochloric acid and the precipitated dyestuff acid is separated off, dissolved in water and potassium carbonate, and the dyestuff is isolated with potassium chloride.

The dyestuff so obtained is a grey olive powder which dissolves in water with an olive coloration and in concentrated sulphuric acid with a brown coloration.

In chrome printing on cotton the dyestuff yields yellow olive tints.

Example 34

48.1 parts (1/20 mol) of iron phthalocyanine-4:4':4'':4'''-tetrasulphochloride, obtained by the action of chlorosulphonic acid on the barium salt of iron phthalocyanine-4:4':4'':4'''-tetrasulphonic acid, are mixed well with 250 parts of ice, and the whole is rapidly added, while stirring, to a solution of 19.8 parts (1/10 mol) of the disodium salt of 1:3-dihydroxybenzene-4-carboxylic acid and 30.9 parts (1/10 mol) of the sodium salt of 4-amino-3-methoxy-4'-hydroxy-1:1'-azobenzene - 5' - carboxylic acid in 500 parts of water, to which have been added 10 parts of calcium carbonate. The whole is stirred for 24 hours at room temperature and the dyestuff is isolated in the form of its sodium salt.

The dyestuff so obtained is a grey-green powder which dissolves in water with a green coloration and in concentrated sulphuric acid with a pink coloration.

In chrome printing on cotton the dyestuff yields dull green tints having good properties of fastness.

Example 35

93.3 parts (1/10 mol) of aluminium phthalocyanine tetrasulphochloride, obtained by the action of chlorosulphonic acid on aluminium phthalocyanine, are discharged on to ice and the separated reaction product is mixed as a moist paste with 300 parts of ice, and the paste is rapidly added to a solution of 39.6 parts (2/10 mol) of the disodium salt of 1:3-dihydroxybenzene-4-carboxylic acid and 30.9 parts (1/10 mol) of the sodium salt of 4-amino-3 - methoxy - 4' - hydroxy - 1:1' - azobenzene - 5' - carboxylic acid in 600 parts of water, to which have been added 15 parts of calcium carbonate. The whole is stirred at room temperature for 24 hours and the dyestuff is isolated in the form of its sodium salt.

The dyestuff so obtained is a green powder which dissolves in water with a green coloration and in concentrated sulphuric acid with a brown coloration.

In chrome printing on cotton it yields grass green tints having good properties of wet fastness and a moderate fastness to light.

What I claim is:

1. A member selected from the class consisting of water-soluble mordant azo-phthalocyanine dyestuffs which correspond to the formula

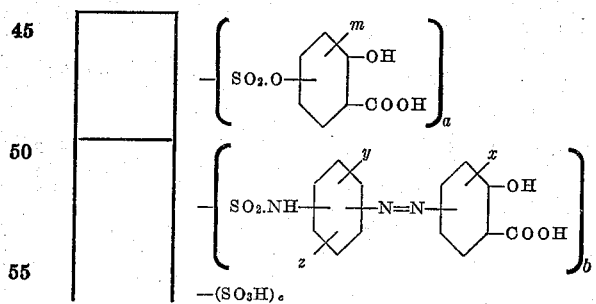

and the alkali metal salts thereof, wherein A represents a metal-containing phthalocyanine molecule in which the —$SO_2$.O—, —$SO_2$.NH— and $SO_3H$ groups are severally present in one of the 3- and 4-positions, said metal being selected from the group consisting of copper, cobalt, nickel, iron, chromium and aluminum, $m$ is a member selected from the group consisting of H, halogen and $CH_3$ bound in ortho-position to the —$SO_2$.O— linkage, $x$ is a member selected from the group consisting of H, $CH_3$, OH, $NO_2$ and $SO_3H$, $y$ is a member selected from the group consisting of H, $CH_3$, $OCH_3$, $SO_3H$ and COOH bound in ortho-position to the azo group, $z$ is a member selected from the group consisting of H and $OCH_3$ bound in ortho-position to the —$SO_2$.NH— linkage, $a$ and $b$ each represents a whole number from 1 to 3 inclusive, $c$ is a number from 0 to 2, and the sum of $a+b+c=4$, and wherein the —$SO_2$.NH— group occupies one of the positions meta and para relatively to the azo linkage.

2. An alkali metal salt of the dyestuff of the formula

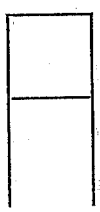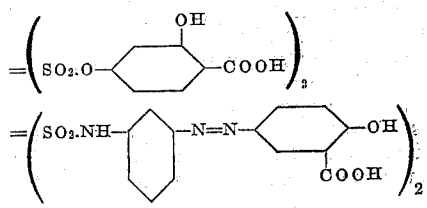

wherein A represents the molecule of copper phthalocyanine to which the —SO₂.O— and —SO₂.NH— groups are bound in the 4-positions.

3. An alkali metal salt of the dyestuff of the formula

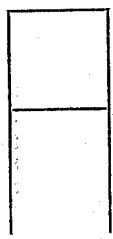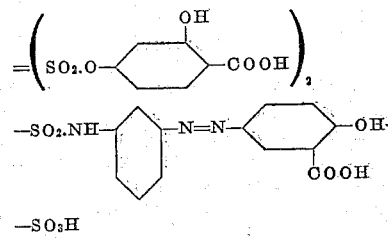

wherein A represents the molecule of copper phthalocyanine to which the —SO₂.O—, —SO₂.NH— and —SO₃H groups are bound in the 3-positions.

4. An alkali metal salt of the dyestuff of the formula

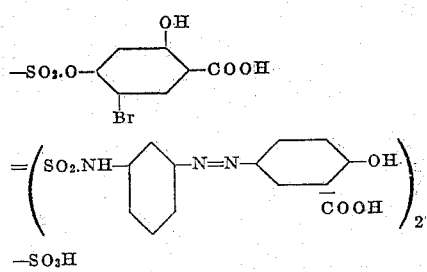

wherein A represents the molecule of copper phthalocyanine to which the —SO₂.O—, —SO₂.NH— and —SO₃H groups are bound in the 3-positions.

5. An alkali metal salt of the dyestuff of the formula

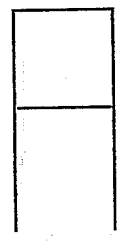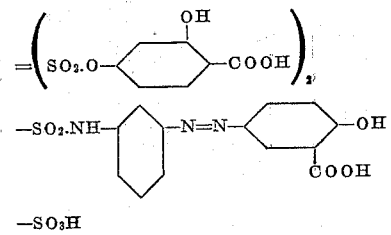

wherein A represents the molecule of brominated copper phthalocyanine, which contains 11.5 percent of bromine calculated on copper phthalocyanine tetrasulphonic acid, and to which the —SO₂.O—, —SO₂.NH— and —SO₃H groups are bound in the 4-positions.

6. An alkali metal salt of the dyestuff of the formula

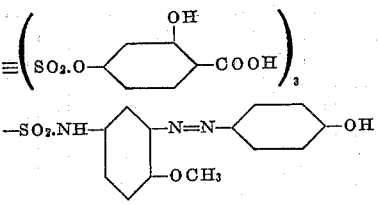

wherein A represents the molecule of cobalt phthalocyanine to which the —SO₂.O— and —SO₂.NH— group are bound in the 4-positions.

7. A process for the manufacture of a water-soluble mordant azo-phthalocyanine dyestuff, which comprises reacting one molecular proportion of a phthalocyanine sulphochloride which corresponds to the formula

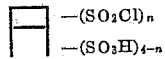

wherein A represents a metal-containing phthalocyanine molecule in which the —SO₂CL and —SO₃H groups are severally present in one of the 3- and 4-positions, said metal being selected from the group consisting of copper, cobalt, nickel, iron, chromium and aluminum, and $n$ represents a whole number from 1 to 4, with at least one molecular proportion of an aminoazo dyestuff which corresponds to the formula

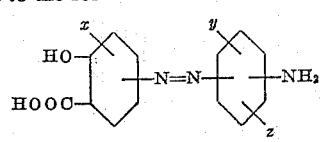

wherein $x$ is a member selected from the group consisting of H, CH₃, OH, NO₂ and SO₃H, $y$ is a member selected from the group consisting of H, CH₃, OCH₃, SO₃H and COOH bound in ortho-position to the azo group, $z$ is a member selected from the group consisting of H and OCH₃ bound in ortho-position to the NH₂ group, and wherein the NH₂ group occupies one of the positions meta and para relatively to the azo linkage, and with at least one molecular proportion of a dihydroxybenzene-carboxylic acid which corresponds to the formula

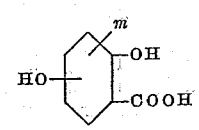

wherein $m$ is a member selected from the group consisting of H, halogen and CH₃ bound in ortho-position to the reacting OH group, in an aqueous medium and in the presence of an acid-binding agent.

References Cited in the file of this patent

UNITED STATES PATENTS

| | | |
|---|---|---|
| 2,288,478 | Nadler et al. | June 30, 1942 |
| 2,351,118 | Haddock | June 13, 1944 |
| 2,363,906 | Rossander et al. | Nov. 28, 1944 |
| 2,479,491 | Haddock et al. | Aug. 16, 1949 |